United States Patent
Baek et al.

(10) Patent No.: US 11,197,188 B2
(45) Date of Patent: Dec. 7, 2021

(54) V2X COMMUNICATION DEVICE AND METHOD FOR OPERATING MULTI-CHANNELS THEREOF

(71) Applicant: LG Electronics Inc., Seoul (KR)

(72) Inventors: Jongseob Baek, Seoul (KR); Woosuk Ko, Seoul (KR); Seoyoung Back, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 16/620,845

(22) PCT Filed: Jun. 8, 2017

(86) PCT No.: PCT/KR2017/005956
§ 371 (c)(1),
(2) Date: Mar. 4, 2020

(87) PCT Pub. No.: WO2018/225883
PCT Pub. Date: Dec. 13, 2018

(65) Prior Publication Data
US 2020/0229019 A1 Jul. 16, 2020

(51) Int. Cl.
*H04W 28/02* (2009.01)
*H04W 4/40* (2018.01)
*H04W 40/12* (2009.01)

(52) U.S. Cl.
CPC ......... *H04W 28/0215* (2013.01); *H04W 4/40* (2018.02); *H04W 28/0252* (2013.01); *H04W 40/12* (2013.01)

(58) Field of Classification Search
CPC ............... H04W 28/0215; H04W 4/40; H04W 28/0252; H04W 40/12
See application file for complete search history.

(56) References Cited

U.S. PATENT DOCUMENTS

2011/0255482 A1* 10/2011 Holland ............ H04W 72/1221
370/329
2014/0119210 A1* 5/2014 Bansal ................ H04W 28/021
370/252

(Continued)

FOREIGN PATENT DOCUMENTS

WO    WO2016198320    12/2016

OTHER PUBLICATIONS

Autolitano et al. "Understanding the Channel Busy Ratio Metrics for Decentralized Congestion Control in VAMNETs", Nov. 2014, IEEE (Year: 2014).*

(Continued)

*Primary Examiner* — Harry H Kim
(74) *Attorney, Agent, or Firm* — Fish & Richardson P.C.

(57) ABSTRACT

Disclosed is a method for operating multi-channel of a V2X communication device. The method for operating multi-channels of a V2X communication device according to an embodiment of the disclosure comprises the steps of: obtaining channel busy ratio (CBR) information on a reference channel and at least one service channel; selecting a first service channel to be channel-switched on the basis of the CBR information; channel-switching to the first service channel and measuring the CBR information on the first service channel; and transmitting a first transmission packet including first multi-channel CBR information over the first service channel.

10 Claims, 15 Drawing Sheets

(56) References Cited

U.S. PATENT DOCUMENTS

| | | |
|---|---|---|
| 2016/0316486 A1 | 10/2016 | Bai et al. |
| 2017/0265818 A1* | 9/2017 | Kanada ................. A61B 5/352 |
| 2018/0124771 A1* | 5/2018 | Mok ................. H04W 36/0072 |
| 2018/0338259 A1* | 11/2018 | Boban ................... H04W 28/08 |

OTHER PUBLICATIONS

Autolitano et al., "Understanding the Channel Busy Ratio Metrics for Decentralized Congestion Control in VANETs," 2014 International Conference on Connected Vehicles and Expo (ICCVE), dated Nov. 3-7, 2014, 7 pages.

* cited by examiner

FIG. 3
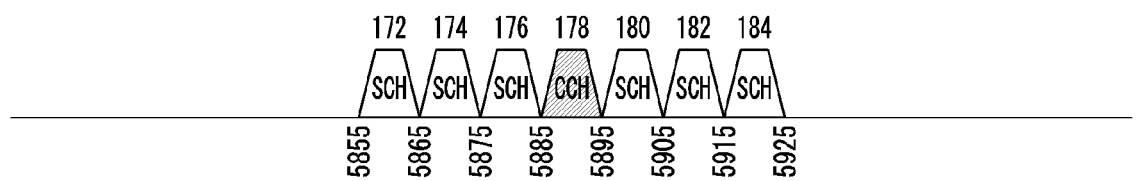
(a)
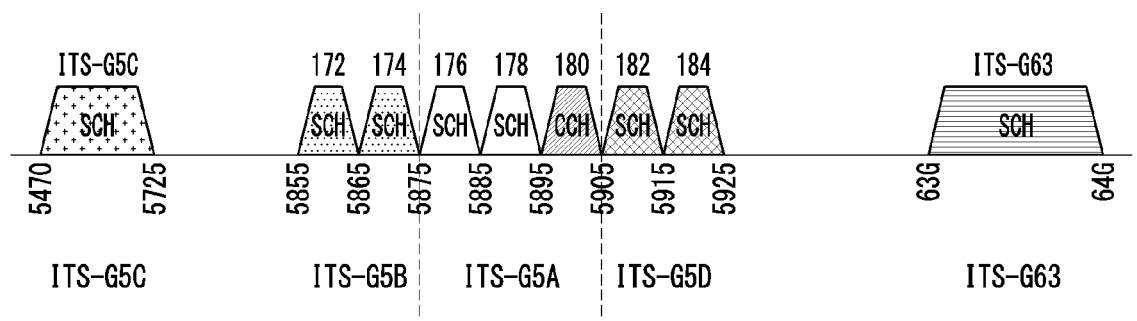
(b)

FIG. 8

| Vehicle | | CBR_R0_Hop | CBR_R1_Hop | Power |
|---|---|---|---|---|
| Vehicle-0 | | CBR_R0_Hop(0) = CBR_L0_Hop(0) | CBR_R1_Hop(0) = CBR_L1_Hop(0) | Power(0) |
| Vehicle-1 | | CBR_R0_Hop(1) = CBR_L0_Hop(1) | CBR_R1_Hop(1) = CBR_L1_Hop(1) | Power(1) |
| Vehicle-2 | | CBR_R0_Hop(2) = CBR_L0_Hop(2) | CBR_R1_Hop(2) = CBR_L1_Hop(2) | Power(2) |
| Vehicle-3 | | CBR_R0_Hop(3) = CBR_L0_Hop(3) | CBR_R1_Hop(3) = CBR_L1_Hop(3) | Power(3) |

(a)

| Ego-vehicle | CBR_L0_Hop = Locally measured CBR | CBR_L1_Hop = max CBR_R0_Hop(i) over i | ~~CBR_L1_Hop = max CBR_R1_Hop(i) over i~~ | Power |
|---|---|---|---|---|

CBR information to be disseminated (b)

FIG. 9

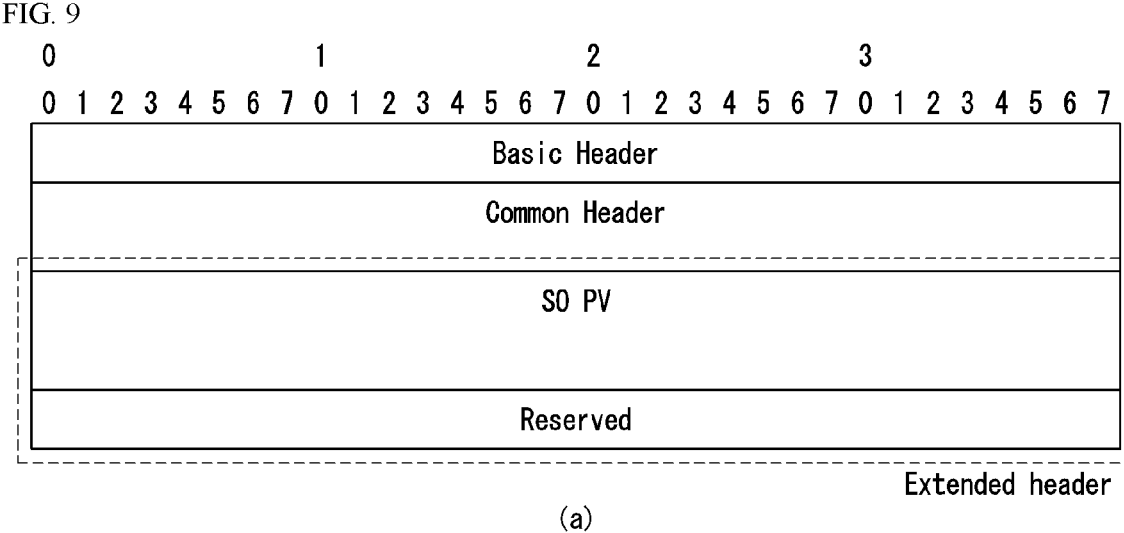

(a)

| Field # | Field name | Octet/bit pos. First | Octet/bit pos. Last | Type | Unit | Description |
|---|---|---|---|---|---|---|
| 1 | Basic Header | | | Basic Header | n/a | Basic Header as specified in clause 8.6 Length: 4octets |
| 2 | Common Header | | | Common Header | n/a | Common Header as specified in clause 8.6 Length: 8octets |
| 3 | Source Position Vector | | | Long PV | n/a | Long position vector |
| 4 | Reserved | | | 32-bit unsigned | n/a | Reserved for media-dependent operations. If not used, it shall be set to 0. |
| NOTE: With ITS-G5, the field is used to transmit DCC-related information |||||||

Extended header (b)

FIG. 11

| Field # | Field name | Octet/bit pos. | | Type | Unit | Description |
|---|---|---|---|---|---|---|
| | | First | Last | | | |
| 1-3 | | | | | | |
| 4 | DCC-MCO | Octet 40 | Octet 43 | 15-byte unsigned integer | n/a | for a specific channel (CCH or a single SCH))<br>-. {CH num. \| Current CBR_L0_Hop };<br>-. {CH num. \| Current CBR_L1_Hop };<br><br>for i=1:N_a-1<br>-. {CH num. (i) \| the newest multichannel CBR};<br>end<br>NOTE: N_a: a total number of available frequency channels;<br><br>Bit 0 to Bit 4: Output power (5-bit) of the current packet on CCH and SCHs;<br>Bit 5 to Bit 7: Reserved for future use Reserved for MCO see annex A |

FIG. 13

| Field # | Field name | Octet/bit pos. | | Type | Unit | Description |
|---|---|---|---|---|---|---|
| | | First | Last | | | |
| 1-3 | | | | | | |
| 4 | DCC-MCO | Octet 40 | Octet 43 | 15-byte unsigned integer | n/a | for a specific channel (CCH or a single SCH)) <br> -. {CH num. \| Current CBR_L0_Hop }; <br> -. {CH num. \| Current CBR_L1_Hop }; <br><br> Bit 0 to Bit 4: Output power (5-bit) of the current packet on CCH and SCHs; Bit 5 to Bit 7: Reserved for future use Reserved for MCO see annex A <br> Bit 0: <br> 0: there is no Enhanced Header. <br> 1: there is Enhanced Header. |

FIG. 14

| Field # | Field name | Octet/bit pos. | | Type | Unit | Description (Enhanced Header) |
|---|---|---|---|---|---|---|
| | | First | Last | | | |
| | | | | | | |
| | CBR-MCO | | | | | for i=1:N_a-1<br>-. {CH num. (i) \| the newest multichannel CBR};<br>end<br>NOTE: N_a: a total number of available frequency channels; |

V2X COMMUNICATION DEVICE AND METHOD FOR OPERATING MULTI-CHANNELS THEREOF

CROSS-REFERENCE TO RELATED APPLICATIONS

This application is the National Stage filing under 35 U.S.C. 371 of International Application No. PCT/KR2017/005956, filed on Jun. 8, 2017, the contents of which are hereby incorporated by reference herein their entirety.

TECHNICAL FIELD

The present disclosure relates to an apparatus for V2X communication and a multi-channel operation method thereof and, more particularly, to a V2X communication apparatus for performing channel selection or decentralized congestion control (DCC) by obtaining CBR information for a plurality of channels and transmitting the obtained CBR information for the plurality of channels and a multi-channel operation method thereof.

BACKGROUND ART

Nowadays, a vehicle becomes the results of a complex industry technology in which electrical, electronic and communication technologies have been converged out of mechanical engineering. In this regard, a vehicle is called a smart car. The smart car connects a driver, a vehicle, and traffic infrastructure and provides various user-customized mobile services as well as a traditional vehicle technology, such as traffic safety/congestion solution. Such connectivity may be implemented using a vehicle to everything (V2X) communication technology.

DISCLOSURE

Technical Problem

Various services can be provided through V2X communication. Furthermore, a plurality of frequency bands is used to provide the various services. In such an environment, from the nature of vehicle communication, the delivery and provision of safety services with high reliability is a very important problem. Particularly, it is necessary to prevent channel congestion for a multi-channel operation.

Technical Solution

A multi-channel operation method of a V2X communication apparatus according to an embodiment of the disclosure may include obtaining channel busy ratio (CBR) information for a reference channel and at least one service channel, selecting a first service channel to which switching is to be performed based on the CBR information, performing channel switching to the first service channel and measuring CBR information for the first service channel, and transmitting, in the first service channel, a first transport packet including first multi-channel CBR information, wherein the multi-channel CBR information comprises local 0-hop CBR information and local 1-hop CBR information for each of the reference channel and the at least one service channel including the first service channel.

Furthermore, in the multi-channel operation method of a V2X communication apparatus according to an embodiment of the disclosure, the multi-channel CBR information may further include channel information to identify a channel described by the local 0-hop CBR information and the 1-hop CBR information and power information for the packet.

Furthermore, in the multi-channel operation method of a V2X communication apparatus according to an embodiment of the disclosure, obtaining the CBR information for the reference channel and the at least one service channel may further include receiving, from an external V2X communication apparatus, a second transport packet including remote 0-hop CBR information and remote 1-hop CBR information for the reference channel and the at least one service channel, and measuring local CBR information for the reference channel or the at least one service channel.

Furthermore, in the multi-channel operation method of a V2X communication apparatus according to an embodiment of the disclosure, selecting the first service channel to which switching is to be performed may further include obtaining a maximum CBR value for each service channel from the remote 0-hop CBR information, the remote 1-hop CBR information and the local 0-hop CBR information, and selecting, as the first service channel, a service channel whose maximum CBR value is a minimum.

Furthermore, the multi-channel operation method of a V2X communication apparatus according to an embodiment of the disclosure further includes transmitting, in the reference channel, a second transport packet including second multi-channel CBR information when the first service channel switches to the reference channel. The second multi-channel CBR information may include local 0-hop CBR information and local 1-hop CBR information for each of the reference channel and the at least one service channel including the first service channel.

Furthermore, the multi-channel operation method of a V2X communication apparatus according to an embodiment of the disclosure may further include performing decentralized congestion control (DCC) processing to control data traffic based on the CBR information.

A V2X communication apparatus includes a memory storing data, an RF unit transmitting or receiving a radio signal comprising a transport packet, and a processor configured to control the RF unit. The processor is configured to obtain channel busy ratio (CBR) information fora reference channel and at least one service channel, select a first service channel to which switching is to be performed based on the CBR information, switch to the first service channel, measure CBR information for the first service channel, and transmit, in the first service channel, a first transport packet comprising first multi-channel CBR information. The multi-channel CBR information may include local 0-hop CBR information and local 1-hop CBR information for each of the reference channel and the at least one service channel including the first service channel.

Advantageous Effects

The V2X communication apparatus can obtain and transmit CBR information for a plurality of channels. Accordingly, the V2X communication apparatus can obtain CBR information for another channel in addition to a channel that is now accessed. Accordingly, the V2X communication apparatus can select and access a service channel by considering congestion. Accordingly, overall channel use efficiency can be increased, and channel congestion can also be decreased.

The V2X communication apparatus can transmit CBR information for a plurality of channel after a service channel change. Accordingly, a V2X apparatus that has accessed a specific service channel for a long time can also check a situation for another channel. Communication efficiency can be increased because the V2X apparatus can move to another service channel having less channel congestion if necessary.

The V2X communication apparatus can transmit CBR information for a previously accessed service channel after a control channel change. Accordingly, a V2X apparatuses that now accesses a control channel can also check a situation for other service channels without tuning to another service channel.

In multi-channel communication, the sharing of CBR information for a plurality of channels can provide a great advantage in an efficient multi-channel operation (MCO). The sharing of CBR information for a plurality of channels may help to select a frequency channel in order to deliver services that require high reliability. DCC performance can be improved in an MCO environment because the channel selection capability is improved.

DESCRIPTION OF DRAWINGS

The accompany drawings which are included for further understanding of the disclosure and included in this disclosure and which form part of the disclosure illustrate embodiments of the disclosure along with the detailed description that describes the principle of the disclosure.

FIG. 3 illustrates multi-channel allocation used in an ITS system operation according to an embodiment of the disclosure.

FIG. 8 illustrates reception CBR information and transmission CBR information according to an embodiment of the disclosure.

FIG. 9 illustrates an SHB packet header configuration according to an embodiment of the disclosure.

FIG. 11 illustrates CBR information for an MCO according to an embodiment of the disclosure.

FIG. 13 illustrates an extended header included in a GeoNetworking packet header according to an embodiment of the disclosure.

FIG. 14 illustrates an enhanced header included in a GeoNetworking packet header according to an embodiment of the disclosure.

BEST MODE

Preferred embodiments of the disclosure will be described in detail with reference to the accompanying drawings. The following detailed description with reference to the attached drawings illustrates preferred embodiments of the disclosure rather than illustrating only embodiments that may be implemented according to embodiments of the disclosure. The following detailed description includes details in order to provide a thorough understanding of the disclosure, but the disclosure does not require all of these details. In the disclosure, embodiments described hereinafter are not intended to be respectively used independently. Multiple embodiments or all embodiments may be used together, and specific embodiments may be used in combination.

Most of terms used in the disclosure are selected from general ones widely used in the art, but some terms are optionally selected by an applicant and meanings thereof are described in detail in the following description as needed. Accordingly, the disclosure should be understood based on the intended meaning of the term rather than a simple name or meaning of the term.

The disclosure relates to a V2X communication device, and the V2X communication device may be included in an Intelligent Transport System (ITS) to perform all or some of functions of the ITS system. The V2X communication device may perform communication with a vehicle and a vehicle, a vehicle and an infrastructure, a vehicle and a bicycle, and mobile devices. The V2X communication device may be abbreviated to a V2X device. In an embodiment, the V2X device may correspond to an On Board Unit (OBU) of a vehicle or may be included in an OBU. The V2X device may correspond to a Road Side Unit (RSU) of an infrastructure or may be included in an RSU. Alternatively, the V2X communication device may correspond to an ITS station or may be included in an ITS station. In an embodiment, the V2X device may operate in a Wireless Access In Vehicular Environments (WAVE) system of IEEE 1609.1 to 4.

Figure 1:
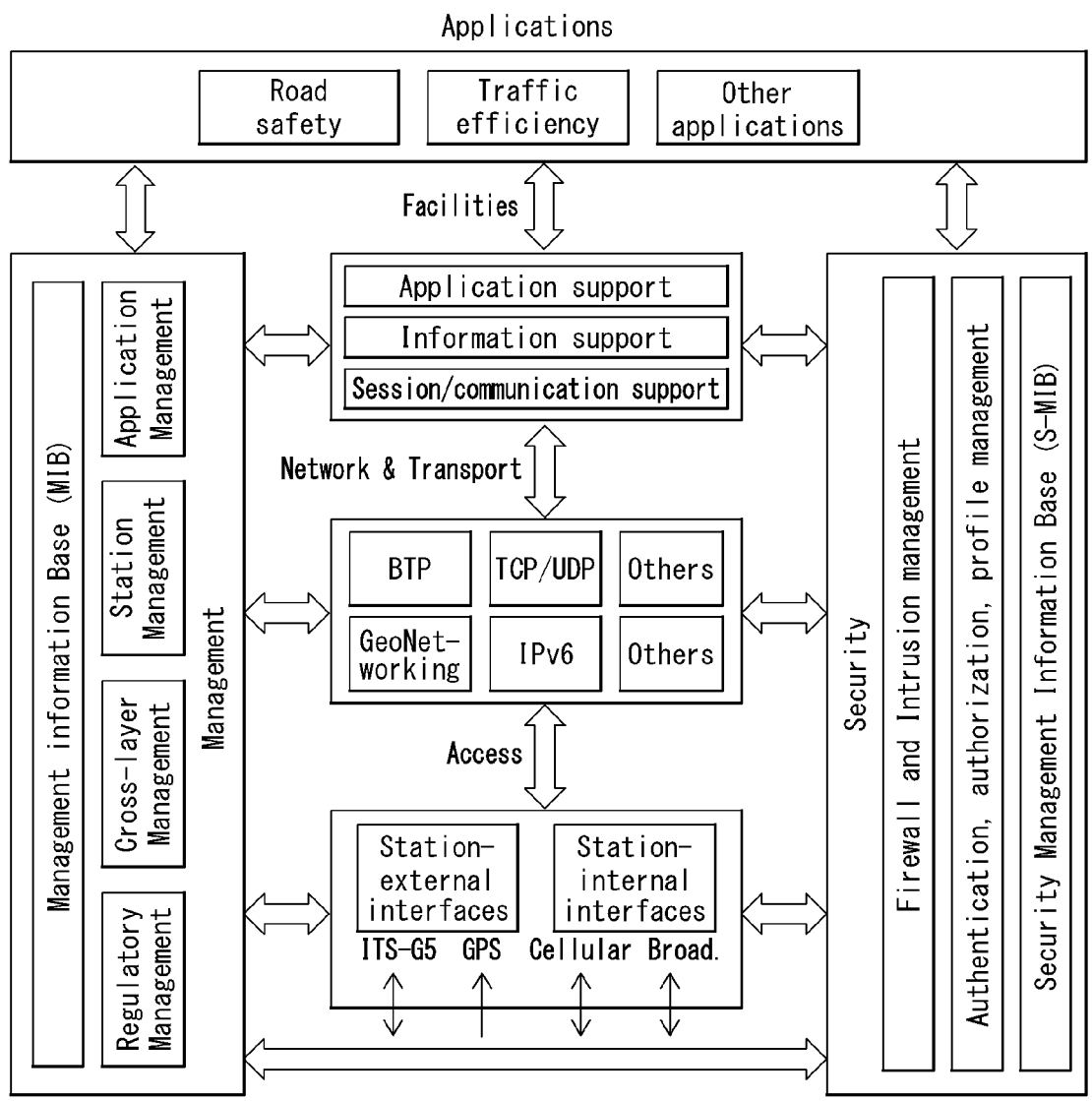
FIG. 1 illustrates reference architecture of an intelligent transport system (ITS) station according to an embodiment of the disclosure.

FIG. 1 illustrates reference architecture of an Intelligent Transport System (ITS) station according to an embodiment of the disclosure.

In the architecture of FIG. 1, two end vehicles/users may communicate with a communication network, and such communication may be performed through a function of each layer of the architecture of FIG. 1. For example, when a message between vehicles is communicated, in a transmitting vehicle and an ITS system thereof, by passing through each layer below one layer, data may be transferred, and in a receiving vehicle and an ITS system thereof, by passing through each layer above one layer, data may be transferred. A description of each layer of the architecture of FIG. 1 is as follows.

Application layer: the application layer may implement and support various use cases. For example, the application may provide road safety, efficient traffic information, and other application information.

Facilities layers: the facilities layer may support to effectively realize various use cases defined at the application layer. For example, the facilities layer may perform application support, information support, and session/communication support.

Networking & Transport layer: the networking/transport layer may constitute a network for vehicle communication between homogenous/heterogenous networks by using various transport protocols and network protocols. For example, the networking/transport layer may provide Internet access and routing using an Internet protocol such as TCP/UDP+IPv6. Alternatively, the networking/transport layer may constitute a vehicle network using a geographical position based protocol such as Basic Transport Protocol (BTP)/GeoNetworking.

Access layer: the access layer may transmit a message/data received from a superordinate layer through a physical channel. For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

ITS architecture may further include a management layer and a security layer.

Figure 2:
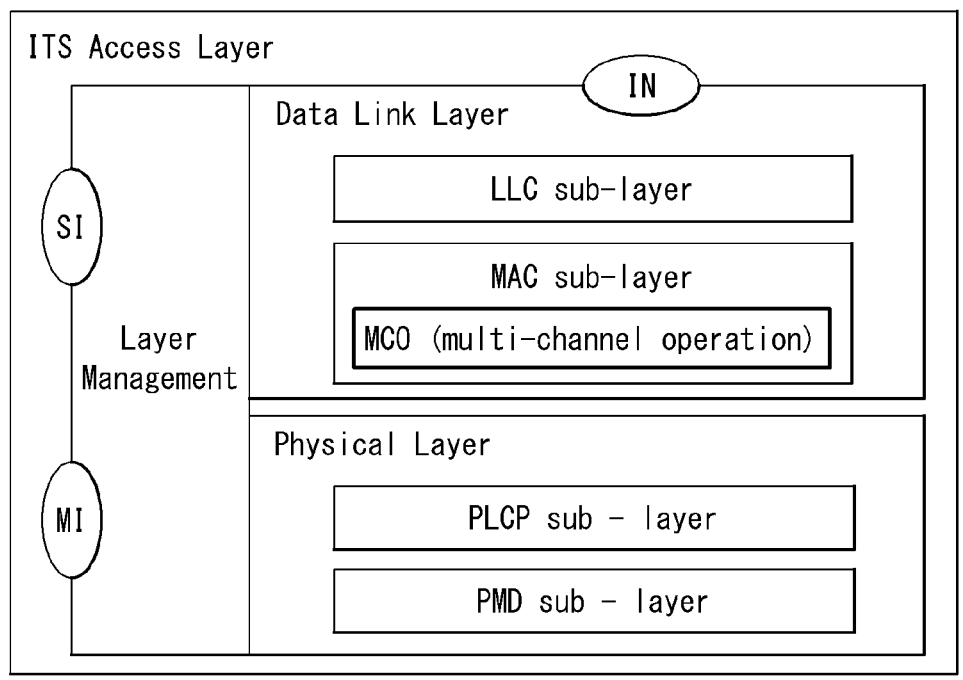
FIG. 2 illustrates an ITS access layer according to an embodiment of the disclosure.

FIG. 2 illustrates an ITS access layer according to an embodiment of the disclosure.

FIG. 2 illustrates in more detail the ITS Access Layer of the ITS system of FIG. 1. The access layer of FIG. 2 may include a data link layer, a physical layer, and layer management. The access layer of FIG. 2 has characteristics similar to or identical to an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

In order to enable a superordinate network layer to use a physical line between adjacent nodes (or between vehicles) having noise, the data link layer may convert the physical line into a communication channel having no transmission error. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, the data link layer performs a function of giving a sequence number to a packet and an ACK signal in order to avoid to erroneously confuse the packet or the ACK signal and a function of controlling setting, maintaining, short-circuit, and data transmission of a data link between network entities. Furthermore, such a data link layer may include a logical link control (LLC) sub-layer and a medium access control (MAC) sub-layer based on IEEE 802 standard.

A main function of the LLC sub-layer is to enable to use several different sub-MAC sub-layer protocols to allow communication unrelated to topology of a network.

The MAC sub-layer may control occurrence of collision/contention between vehicles when several vehicles (or nodes or a vehicle and peripheral devices) use a shared medium. The MAC sub-layer may format a packet transferred from a superordinate layer to correspond to a frame format of the physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying the MAC sub-layer whether a wireless medium is being used (busy or idle) through carrier sense and clear channel assessment (CCA). Furthermore, such a physical layer may include a physical layer convergence protocol (PLCP) sub-layer and a physical medium access (PMD) sub-layer based on IEEE standard.

The PLOP sub-layer performs a function of connecting a data frame with the MAC sub-layer. By attaching a header to the received data, the PLOP sub-layer enables to operate the MAC sub-layer regardless of physical characteristics. Therefore, in the PLOP frame, a format thereof may be defined differently according to various different wireless LAN physical layer standards.

A main function of the PMD sub-layer may perform carrier/RF modulation of frames received from the PLOP sub-layer and then transmit the frames to a wireless medium according to transmission and reception transmission related standards.

Layer management performs a function of managing and servicing information related to an operation and security of an access layer. Information and service are bilaterally transferred and shared through MI (interface between management entity and access layer or MI-SAP) and SI (interface between security entity and access layer or SI-SAP). Two-way information and service transfer between the access layer and a network/transport layer is performed by IN (or IN-SAP).

The MCO sub-layer may provide various services such as a safety service and other services, i.e., a non-safety service other than the safety service using a plurality of frequency channels. By effectively distributing a traffic load in a particular frequency channel to other channels, the MCO sub-layer may minimize collision/contention when communicating between vehicles in each frequency channel. The MCO sub-layer may perform multi-channel access and operation to be described hereinafter based on setting received from the superordinate layer.

FIG. 3 illustrates multi-channel allocation used for an ITS system operation according to an embodiment of the disclosure.

FIG. 3(a) illustrates US spectrum allocation for an ITS, and FIG. 3(b) illustrates EP spectrum allocation for an ITS.

As shown in FIG. 3, the United States and Europe have seven frequencies (each frequency bandwidth: 10 MHz) in 5.9 GHz band (5.855 to 5.925 GHz). Seven frequencies may include one CCH and 6 SCHs. As shown in FIG. 3(a), in the United States, the CCH is allocated to a channel number 178 and as shown in FIG. 3(b), in European, the CCH is allocated to a channel number 180.

In Europe, in order to provide a service that is time-sensitive and having a large data capacity, it is considered to additionally use an ITS-G63 band in a superordinate frequency band based on 5.9 GHz and it is considered to use an ITS-G5 band in a subordinate frequency band. In order to provide a high quality of service by appropriately allocating the service to various multi-channels in such an environment, development of an efficient multi-channel operation method is required.

The CCH indicates a radio channel used for exchange of a management frame and/or a WAVE message. The WAVE message may be a WAVE short message (WSM). The SCH is a radio channel used for providing a service and represents a random channel instead of the CCH. In an embodiment, the CCH may be used for communication of a Wave Short Message Protocol (WSMP) message or communication of a system management message such as a WAVE Service Advertisement (WSA). The SCH may be used for general-purpose application data communication, and communication of such general-purpose application data may be coordinated by service related information such as the WSA.

Hereinafter, the WSA may be also referred to as service advertisement information. The WSA is an application may provide information including announcement of availability of an application-service. A WSA message may identify and describe an application service and a channel in which the service is accessible. In an embodiment, the WSA may include a header, service information, channel information, and WAVE routing advertisement information.

Service advertisement information for service access may be a periodic message. In an embodiment, Co-operative Awareness Messages (CAM) may be periodic messages. The CAM may be broadcasted periodically by a facilities layer. In an embodiment, the CAM may also be transmitted by the RSU, and in such a case, the CAM may be transmitted and received in an RSU interval hereinafter.

Decentralized Environmental Notification Messages (DENM) may be event messages. The event message may be triggered by detection of the event to be transmitted. Service messages may be transmitted to manage a session. In the following embodiments, the event message may include a security message/information. The service message may include a non-safety message/information.

A V2X communication device may broadcast a cooperative awareness message (CAM) or a decentralized environmental notification message (DENM).

The CAM is distributed in an ITS network, and provides information for at least one of the presence, location or communication state of an ITS station. The DENM provides information for a detected event. The DENM may provide information for a given driving situation or event detected by an ITS station. For example, the DENM may provide information for a situation, such as an emergency electronic brake lamp, a traffic accident, a vehicle problem, or a traffic condition.

Hereinafter, the aforementioned multi-channel operation method is described.

As described above, the V2X apparatus performs communication over an adhoc network based on 802.11. In the adhoc network, decentralized congestion control (DCC) may be used in order to stabilize a system operation and for a traffic distribution in a specific frequency channel. In order to effectively manage a DCC algorithm and provide network robustness, channel busy ratio (CBR) information may be exchanged between adjacent devices. In the disclosure, for the CBR information, reference may be made to ETSI TS 102 636-4-2 v.1.1.1. The CBR information may include local CBR information that is autonomously measured and obtained and remote CBR information obtained from an adjacent vehicle.

The V2X apparatus may broadcast the CBR information. That is, each vehicle within an adhoc network can recognize a surrounding channel congestion state by receiving CBR information disseminated by a surrounding vehicle using a V2X apparatus.

Through the dissemination of the CBR information, V2X apparatuses can recognize possible channel congestion in the relation between adjacent V2X apparatuses. Although a V2X apparatus does not recognize a local congestion channel state based on the CBR information, V2X communication apparatus can recognize possible channel congestion to which they may contribute.

The CBR information may be carried by a single hob broadcast (SHB) packet generated in the network & transport layers. The CBR information may be included in the SHB packet header and transmitted. The CBR information means CBR information for a given specific frequency channel. Accordingly, as described above, if a V2X apparatus performs multi-frequency communication, CBR information for a plurality of frequency channels may need to be disseminated. If a V2X apparatus selects a specific channel in a multi-frequency channel and performs communication between vehicles, information for the multi-frequency channel is necessary for effective vehicle communication. The information chiefly includes CBR information indicating a channel congestion degree. In an embodiment, the CBR information may be carried by a Multi Hop (MH) packet.

In a multi-channel communication, the sharing of CBR information for a plurality of channels can provide a great advantage in an efficient multi-channel operation (MCO). The sharing of CBR information for a plurality of channels may help to select a frequency channel in order to deliver services that require high reliability. DCC performance can be improved in the MCO environment because the channel selection capability is enhanced.

Hereinafter, a CBR information sharing method for an MCO is described. A method of transmitting CBR information for a multi-channel in the header of an SHB packet in the network/transport layer is described below. Furthermore, a method of generating disseminating CBR information based on received global CBR information and measured local CBR information is described below. A V2X apparatus according to the disclosure can perform a multi-channel operation having low latency and high reliability by selecting a communication channel based on such CBR information.

Figure 4:
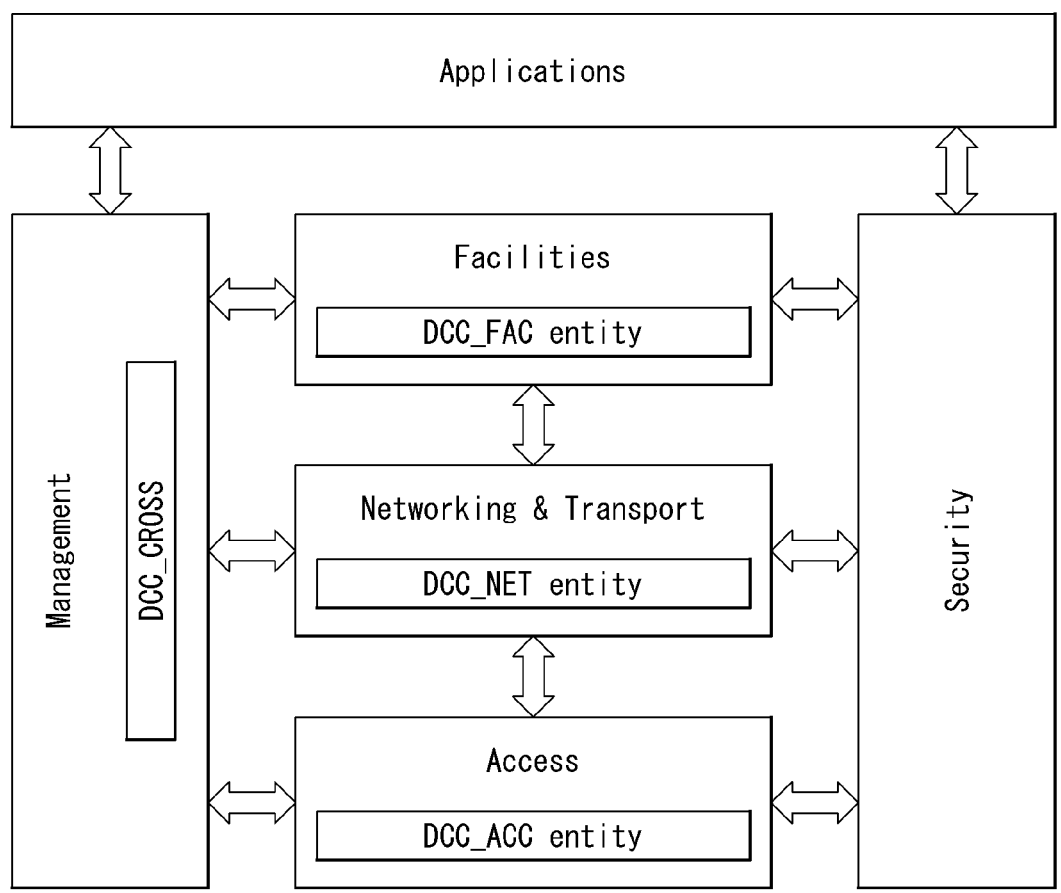
FIG. 4 illustrates the configuration of an intelligent transport system (ITS) station according to an embodiment of the disclosure.

FIG. 4 illustrates the configuration of an intelligent transport system (ITS) station according to an embodiment of the disclosure.

The description of each layer in FIG. 4 is the same as that in FIG. 1. FIG. 4 includes additional entities for performing a DCC function according to an embodiment of the disclosure. Hereinafter, additional entities necessary to perform DCC is described.

A DCC_ACC entity is included in the access layer, and controls traffic congestion by controlling the function of the access layer. In an embodiment, the DCC access layer entity can perform power size control.

A DCC_NET entity is included in the network & transport layer, and can perform a DCC function. The DCC network entity may insert measured CBR information into an SHB packet and transmit the SHB packet, or may perform DCC using CBR information received from an adjacent vehicle. The DCC network entity can improve the accuracy of CBR information used for a DCC algorithm.

A DCC_FAC entity is included in the facility layer, and can perform a DCC function. The DCC facility entity can reduce traffic congestion by controlling the function of the facility layer. In an embodiment, the DCC facility layer can control traffic congestion by controlling a message generation rate.

A DCC_CROSS entity is included in the management layer, and can perform a DCC function. The DCC cross entity may be referred to as a DCC management entity. The DCC cross entity may perform an overall DCC operation by controlling the DCC access entity, DCC network entity, and DCC facility entity included in the protocol layer. The DCC cross entity may provide a parameter or a useful CBR value to the DCC entities included in the protocol layer.

Figure 5:
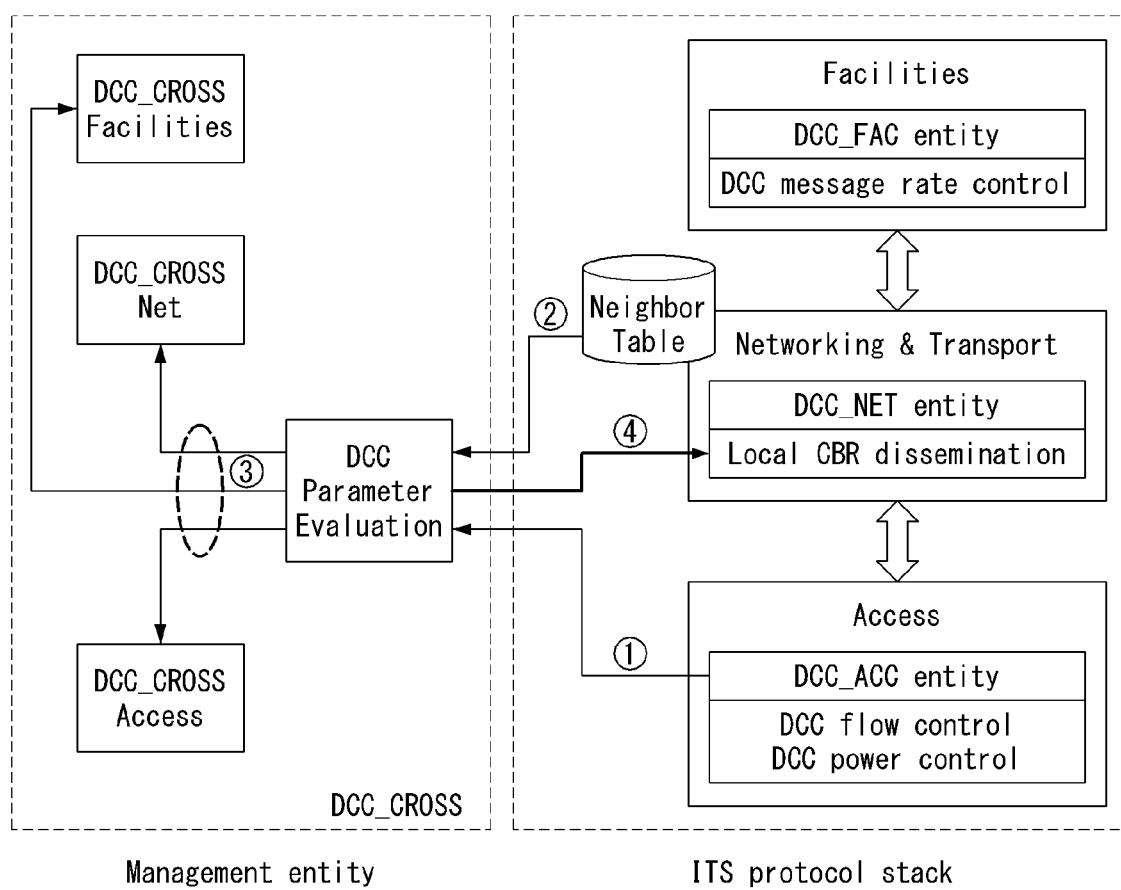
FIG. 5 illustrates DCC processing according to an embodiment of the disclosure.

FIG. 5 illustrates DCC processing according to an embodiment of the disclosure.

In FIG. 5, the DCC processing may be described as follows. (1) The DCC entity measures a local CBR. (2) The DCC entity receives the global CBRs (global DCC parameters) of adjacent vehicles. (3) The DCC entity generates an internal CBR (or internal DCC parameter). (4) The DCC entity transmits a global CBR (or global DCC parameter). A detailed description for the operation is as follows.

As in FIG. 5, a management entity includes a DCC cross entity (DCC_CROSS). The DCC cross entity may include a DCC cross access entity (DCC_CROSS Access), a DCC cross network entity (DCC_CROSS Net), a DCC cross facility entity (DCC_CROSS Facilities) and a DCC parameter evaluation entity (DCC Parameter Evaluation). An operation of each entity is as follows.

The DCC parameter evaluation entity may compute DCC internal parameters indicative of an available channel resource based on CBR values. The CBR values may be collected by a CBR evaluation function or may be received from a DCC network entity.

The DCC cross access entity (DCC_CROSS Access) may determine DCC flow control and DCC power control parameters. The DCC cross access entity may determine a DCC flow control and DCC power control parameter for radio channels respectively used based on the internal DCC parameters computed by the DCC parameter evaluation entity. The DCC cross access entity may provide the DCC access entity with the DCC flow control and the DCC power control parameter.

The DCC cross network entity (DCC_CROSS Net) may return available resources per radio channel to the DCC network entity.

The DCC cross facility entity (DCC_CROSS Facilities) may determine an application registered using an internal DCC parameter from the DCC parameter evaluation function and an available channel resource limit for basic facility services. The determined value may be provided to the DCC facility entity.

The DCC parameter evaluation entity (DCC Parameter Evaluation) may generate internal CBR information used within an ITS station using received global CBR information and local CBR information. The global CBR information may be received from adjacent vehicles based on a neighbor table. The local CBR information may be provided by the DCC access entity of the access layer.

The generated internal CBR information may be delivered to each of the DCC entities of the protocol stack. Each of the DCC entities of the protocol may perform a DCC function based on the CBR information. The DCC entities of the protocol stack may receive internal CBR information, and may estimate a parameter value for performing the DCC function.

Figure 6:
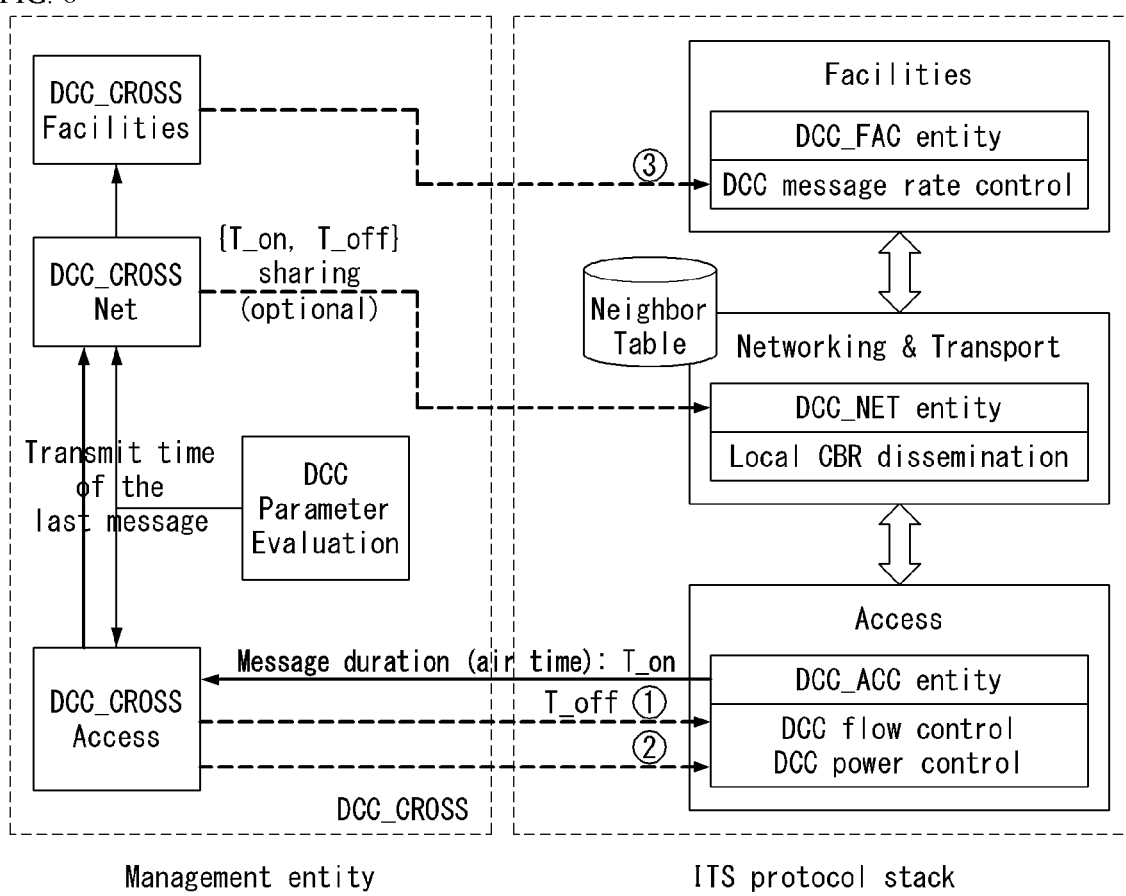
FIG. 6 illustrates DCC processing according to an embodiment of the disclosure.

FIG. 6 illustrates DCC processing according to an embodiment of the disclosure.

In FIG. 6, the DCC operation may be described as follows. (1) The DCC entity may compute an idle time parameter (T_off) for DCC flow control. (2) The DCC entity may compute a power parameter for DCC power control. (3) The DCC entity may compute a rate parameter for DCC message rate control. In FIG. 5, a V2X apparatus may control data traffic by performing the DCC processing of FIG. 6 after the DCC processing described in FIG. 5.

The DCC entity may deliver DCC parameters, computed in the DCC cross access entity, the DCC cross network entity and the DCC cross facility entity, the DCC facility entity (DCC_FAC entity), DCC network entity (DCC_NET entity), and DCC access entity (DCC_ACC entity) of each protocol using internal CBR information. The DCC entity of each layer may perform a DCC operation. In an embodiment, a power control parameter may be delivered to the DCC power control block of the DCC access entity. Furthermore, a message rate control parameter generated in the DCC cross facility may be delivered to the DCC message rate control block of the DCC FCC entity.

The DCC access entity may perform at least one operation of DCC flow control or DCC power control based on a received parameter. The DCC facility entity may receive a message rate control parameter, and may control a transmission message generation rate based on the received parameter.

Hereinafter, a CBR information sharing method for the aforementioned DCC processing is described.

A channel busy ratio (CBR) indicates a time-dependent value of 0 or more to 1 or less indicating a fraction of time that is busy for a channel. A local channel busy ratio (CBR) is a CBR locally perceived by a specific ITS station, and indicates a time-dependent value of 0 or more to 1 or less. A 1-hop CBR indicates the highest local CBR received by an ITS station from a 1-hop adjacent vehicle (neighborhood) during a specific time. A 2-hop CBR indicates the highest 1-hop CBR received from a 1-hop adjacent vehicle during a specific time. A global CBR indicates a maximum of the local CBR, the 1-hop CBR and the 2-hop CBR. Such information may be signaled as the following parameter/information.

The definition of signaling information transmitted or received in relation to each CBR is as follows. In the disclosure, an ITS station itself may be referred to as an ego ITS station.

CBR_L0_Hop: A local CBR for a specific frequency channel with respect to an ITS station itself.

CBR_L1_Hop: the highest value of CBR_R0_Hop received from an adjacent ITS station. This value indicates a 1-hop CBR.

CBR_L2_Hop: the highest received value of CBR_R1_Hop received from an adjacent ITS station. This value indicates a 2-hop CRB.

CBR_R0_Hop: CBR_L0_HOP information disseminated within a single hop broadcast packet.

CBR_R1_Hop: CBR_L1_HOP information disseminated within a single hop broadcast packet.

CBR_target: a global CBR intended to be achieved by DCC. A CBR target information/value may be a single common parameter for all the access layer and network & transport layer DCC algorithms.

CBR_G: a global CBR of an ITS station itself. It may be a maximum value of CBR_L0_Hop, CBR_L1_Hop and CBR_L2_Hop.

In the case of the aforementioned parameters, CBR_L0_Hop may be referred to as local 0-hop CBR information, CBR_L0_Hop may be referred to as local 1-hop CBR information, CBR_R0_Hop may be referred to as remote 0-hop CBR information, and CBR_R1_Hop may be referred to as remote 1-hop CBR information. The local CBR information is a CBR value within a V2X apparatus, and the remote CBR information is a transmitted CBR value. That is, one V2X apparatus generates and transmits local CBR information. The transmitted local CBR information may be received as remote CBR information. Furthermore, the received remote CBR information is used to generate local CBR information.

Figure 7:
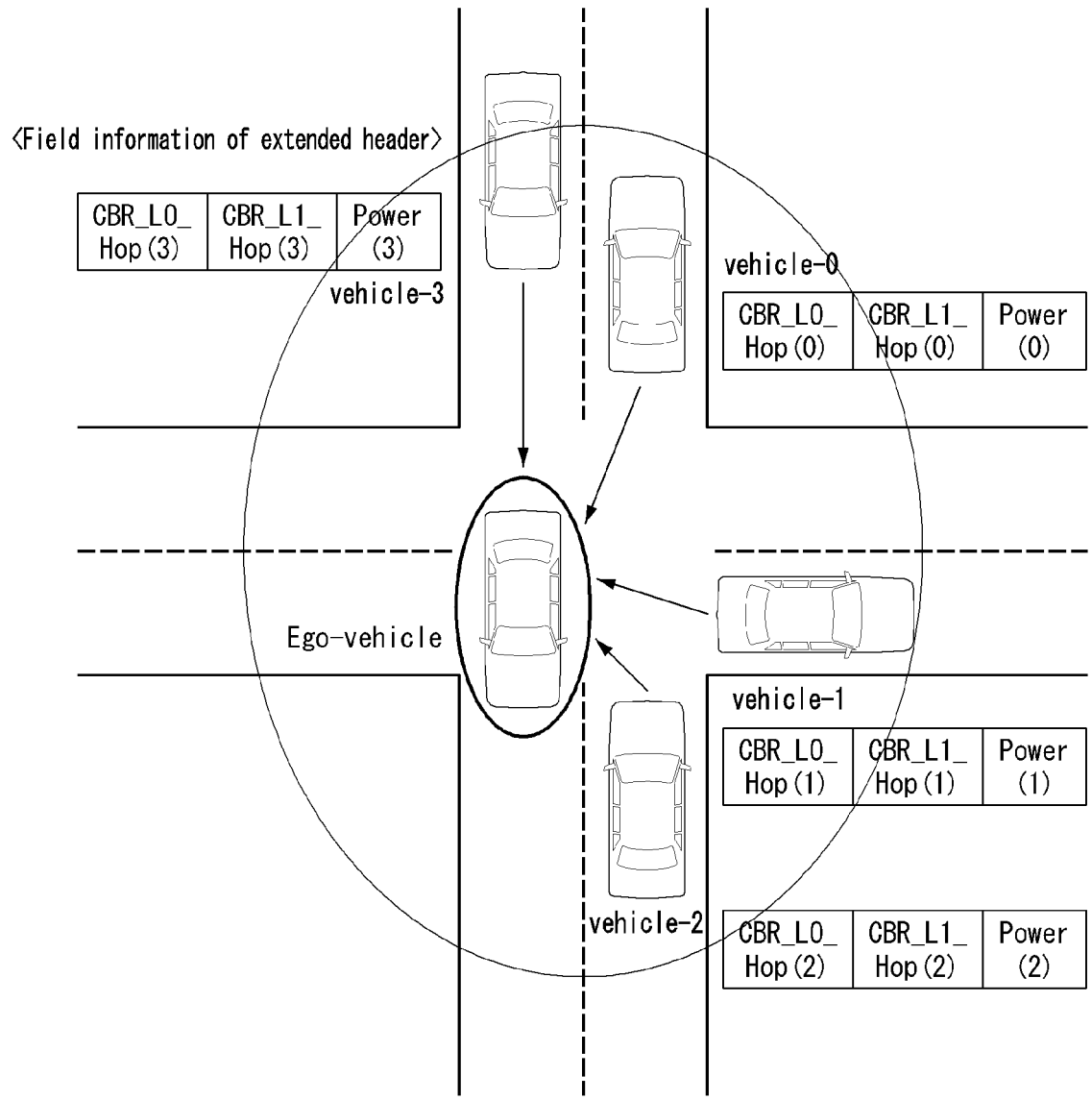
FIG. 7 illustrates a communication method of transmitting or receiving CBR information according to an embodiment of the disclosure.

FIG. 7 illustrates a communication method of transmitting or receiving CBR information according to an embodiment of the disclosure.

CBR information may be carried by the extended header of an SBR packet. In FIG. 7, an ego vehicle is a vehicle on which a V2X communication apparatus, that is, the subject that performs an operation according to an embodiment of the disclosure, has been mounted. In the embodiment of FIG. 7, the followings may be assumed.

A CCH is a reference channel and may provide safety services.

Each vehicle has a single transceiver.

An ego vehicle may update CBR information by aggregating the CBR information from adjacent vehicles.

As in FIG. 7, vehicles (vehicle-0~3) transmit pieces of CBR information, respectively. The ego vehicle may generate its own CBR information by aggregating the CBR information received from the vehicles, and may transmit the CBR information to adjacent vehicles. Each of the vehicles may transmit local 0-hop CBR information (CBR_L0_Hop), local 1-hop CBR information (CBR_L1_Hop) and power (electric power) information. The local 0-hop CBR information indicates its own local CBR information, and the local 1-hop CBR information indicates CBR information received with a 1 hop. The power information indicates output power of a transmitted packet.

FIG. 8 illustrates reception CBR information and transmission CBR information according to an embodiment of the disclosure.

FIG. 8(a) illustrates CBR information that is received from adjacent vehicles and stored.

As in FIG. 7, a V2X apparatus receives CBR information from adjacent vehicles and stores the received CBR information. The stored CBR information may be referred to as a CBR table, a received CBR table or a neighbor table.

As described above, when local CBR information is transmitted, it is stored as remote CBR information on the reception side. That is, local 0-hop CBR information is stored as remote 0-hop CBR information, and local 1-hop CBR information is stored as remote 1-hop CBR information.

A maximum value among the stored remote 0-hop CBR information may become local 1-hop CBR information. Furthermore, a maximum value among the stored remote 1-hop CBR information may become local 2-hop CBR information.

FIG. 8(b) illustrates the CBR information disseminated to adjacent vehicles.

A V2X apparatus generates CBR information to be disseminated to adjacent vehicles based on a stored CBR table. Like adjacent vehicles, the V2X apparatus may transmit local 1-hop CBR information (CBR_L1_Hop) corresponding to a maximum value among locally measured local 0-hop CBR information (CBR_L0_Hop) and received remote 0-hop CBR information. The CBR information may include CBR L0 hop information and CBR L1 hop information. The locally measured local 0-hop CBR information may be measured in the access layer.

The V2X apparatus may estimate a CBR (max {local CBR, CBR_R0_Hop, CBR_R1_Hop}) for DCC. The V2X apparatus may set, as global CBR information, a maximum value among the local 0-hop CBR information, the local 1-hop CBR information and the local 2-hop the CBR information, and may perform DCC processing using the global CBR information.

FIG. 9 illustrates an SHB packet header configuration according to an embodiment of the disclosure.

CBR information may be included and transmitted in the header of an SHB packet. The SHB packet is a packet used for 1-hop communication in a GeoNetworking packet. The GeoNetworking packet may include at least one of a basic header, a common header and an extended header. The basic header and the common header may be applied to all packet types in common.

FIG. 9(a) illustrates the header configuration of an SHB packet according to an embodiment of the disclosure. The SHB packet header includes a basic header, a common header and an extended header. The extended header includes a source position vector. (SO PV) field and a reserved field.

FIG. 9(b) illustrates the fields of the SHB packet header. FIG. 9(b) illustrates a packet header configuration in a field unit. The SHB packet header may include a basic header field, a common header field, and an extended header field. The extended header field includes a source position vector field. Furthermore, in an embodiment of the disclosure, DCC-related information may be transmitted in the reserved field of the extended header. That is, multi-channel CBR information may be included in a DHB packet header.

A DCC-MCO field may be added to the extended header of the SHB packet header. The DCC-MCO field may be referred to as multi-channel CBR information. The multi-channel CBR information may include CBR L0 hop information for at least one channel, CBR L1 hop information, and output power information of a current packet. In an embodiment, 8 bits may be allocated to each piece of information.

However, as described above, for a multi-channel operation, the exchange of CBR information for one channel is not sufficient. Hereinafter, a multi-channel CBR information configuration and CBR information processing method for a multi-channel operation is specifically described.

Fora multi-channel operation, CBR information may be additionally configured. The disclosure proposes a method of configuring and managing separate CBR information for a CCH and an SCH. However, in the case of the SCH, CBR information for each of a plurality of SCHs may be configured. Multi-channel CBR information according to an embodiment of the disclosure may include the following CBR information.

(1) CBR information for a CCH

CCH_CBR_L0_Hop: local CBR of an ITS station itself fora CCH

CCH_CBR_L1_Hop: the highest value among received CCH_CBR_R0_Hop values for a CCH CCH_CBR_L2_Hop: the highest value among received CCH_CBR_R1_Hop values for a CCH CCH_CBR_R0_Hop: a local CBR (CCH_CBR_L0_Hop) for a CCH disseminated through an SHB packet in a CCH CCH_CBR_R1_Hop: the highest value CBR (CCH_CBR_L1_Hop) among a single hop for a CCH disseminated through an SHB packet in a CCH CCH_CBR_target: a global CBR intended to be achieved by DCC for a CCH CCH_CBR_G: a global CBR fora CCH (2) CBR information for an SCH SCH_i_CBR_L0_Hop: a local CBR of an ITS station itself for an i-th SCH SCH_i_CBR_L1_Hop: the highest value among received CCH_CBR_R0_Hop values for an i-th SCH SCH_i_CBR_L2_Hop: the highest value among received CCH_CBR_R1_Hop values for an i-th SCH SCH_i_CBR_R0_Hop: a local CBR (SCH_i_CBR_L0_Hop) for an i-th SCH disseminated through an SHB packet in an i-th SCH SCH_i_CBR_R1_Hop: the highest value CBR (SCH_i_CBR_L1_Hop) among a single hop for an i-th SCH disseminated through an SHB packet in an i-th SCH SCH_i_CBR_target: a global CBR intended to be achieved by DCC for an i-th SCH By using the aforementioned CBR values for a CCH and an SCH, respectively, a V2X apparatus can perform DCC processing on each of a plurality of channels, and can select a channel that has the smallest congestion or that can minimize congestion when selecting a service channel.

Figure 10:
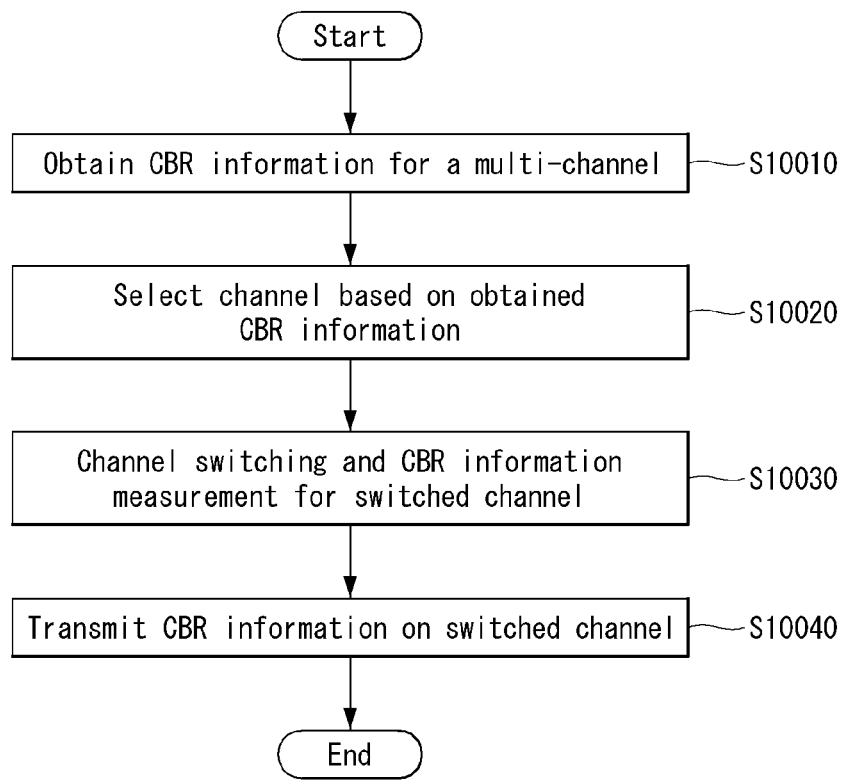
FIG. 10 illustrates a method of generating and transmitting CBR information according to an embodiment of the disclosure.

FIG. 10 illustrates a method of generating and transmitting CBR information according to an embodiment of the disclosure.

The V2X communication apparatus may obtain CBR information for a multi-channel (S27010). The V2X communication apparatus may receive an SHB packet, including CBR information for a plurality of channels, from adjacent ITS stations on a reference channel. The V2X communication apparatus may obtain remote 0-hop CBR information and remote 1-hop CBR information for a reference channel and at least one service channel from a transport packet (SHB packet). Furthermore, the V2X communication apparatus may measure local CBR information for the reference channel.

In an embodiment, the V2X communication apparatus may also measure local CBR information for the service channel other than the reference channel. The V2X communication apparatus may obtain CBR information for a multi-channel as described above. The obtained CBR information may include at least one of (1) CBR information for a CCH and (2) CBR information for an SCH as described above.

The V2X communication apparatus may select a channel based on the obtained CBR information (S27020). The V2X communication apparatus may select an optimum communication channel for the transmission or reception of target services. The V2X communication apparatus may select a channel whose highest CBR value is the lowest based on aggregated CBR information. In other words, the V2X communication apparatus may obtain a maximum CBR value from remote 0-hop CBR information, remote 1-hop CBR information and local 0-hop CBR information with respect to each service channel. Furthermore, the V2X communication apparatus may select, as a service channel, a service channel whose maximum CBR value is a minimum and on which switching will be performed.

In an embodiment, the V2X communication apparatus may select a service channel on which switching will be performed based on a maximum CBR value per channel. The V2X communication apparatus may select one channel based on an additional criterion among some channels whose maximum CBR value is small although a corresponding channel is not a channel whose maximum CBR value is a minimum.

The V2X communication apparatus may switch a channel and measure CBR information for the switched channel (S27030). An ITS station may switch to a selected channel, and may measure CBR information to be used for DCC processing.

The V2X communication apparatus may transmit the CBR information to the switched channel (S27040). The V2X communication apparatus may transmit a transport packet including multi-channel CBR information. The multi-channel CBR information includes CBR information for a reference channel and at least one service channel including the switched service channel. That is, the multi-channel CBR information includes local 0-hop CBR information and the local 1-hop CBR information for each of a control channel and a service channel. In this case, the local 1-hop CBR information may be a maximum value among remote 0-hop CBR information received by the V2X communication apparatus with respect to the corresponding service channel in the reference channel.

The multi-channel CBR information includes local 0-hop CBR information and information on a channel described by the local 1-hop CBR information. The channel information may be included as channel number information. The multi-channel CBR information may further include power information for a transport packet with respect to a channel described by the local 0-hop CBR information and the local 1-hop CBR information.

In an embodiment, the V2X communication apparatus may move to a reference channel again after services use is ended. After switching to the reference channel, the V2X apparatus may transmit multi-channel CBR information again in the reference channel. The multi-channel CBR information may include CBR information for the accessed service channel and CBR information measured in the reference channel. That is, the multi-channel CBR information may include local 0-hop CBR information and local 1-hop CBR information for each of the reference channel and the service channel that had been accessed.

The V2X communication apparatus may select a channel based on the CBR information, and may perform switching and also perform DCC processing for controlling data traffic based on the CBR information.

Hereinafter, the steps of FIG. 10 are more specifically described.

1. Obtain CBR information (S10010)

The V2X apparatus may obtain CBR information for a multi-channel from an SHB packet received from an adjacent vehicle in a CCH use. The SHB packet may be received through a CCH or a specific SCH. The V2X apparatus may obtain CBR information for an adjacent vehicle and at least one channel from the extended header of the received SHB packet, and may update the CBR information: The CBR information for one channel may be set as CBR information having a maximum value among received CBR values. In the disclosure, the SHB packet may be transmitted in a CCH channel. Multi-channel information of the received SHB packet may be configured with the following three modes based on a channel use state of a transmission vehicle. A CCH may be referred to as a reference channel.

(1) If a V2X Apparatus that Transmits CBR Information Continuously Uses a CCH Channel If a V2X apparatus continuously uses a CCH channel, the corresponding V2X apparatus may receive and obtain CBR information for a plurality of channels. That is, the V2X apparatus that uses a CCH channel may obtain and update CBR information for a plurality of channels, and may transmit such CBR information. The V2X apparatus may aggregate CBR information for a plurality of channels received through a CCH channel, and may periodically transmit the CBR information through an SHB packet.

In an embodiment, the V2X apparatus may transmit CBR information for a CCH and at least one SCH through an SHB packet. CBR information for a plurality of channels that is periodically transmitted can greatly improve the channel selection and DCC operation of a vehicle that has newly entered an adhoc network or a vehicle incapable of directly obtaining multi-channel CBR information due to a poor channel environment. The update of the CBR information for a multi-channel may be performed using time stamp information. If the expiration time of received CBR information for a multi-channel elapses, the V2X apparatus may neglect the corresponding CBR information.

(2) If a V2X Apparatus that Transmits CBR Information Moves/Changes its Channel from an SCH to a CCH A V2X apparatus that has switches from an SCH channel to a CCH may transmit, to an adjacent vehicle, recent CBR information for the SCH used before it moves to the CCH. In this case, a transmitted SHB packet may provide CBR information for one channel.

In an embodiment, after an SCH_1 channel is used, a V2X apparatus that has changes its channel to a CCH may transmit an SHB packet, including CBR information for the CCH and CBR information for the SCH_1. In an embodiment, a V2X apparatus that has changed its channel from an SCH to a CCH has channel access priority after the channel change. Accordingly, the V2X apparatus can transmit recent CBR information for the SCH and new CBR information for the CCH.

(3) After a V2X Apparatus that Transmits CBR Information Changes its Channel from an SCH to a CCH and Transmits CBR Information for Previous SCH A V2X apparatus that has changed its channel from an SCH to a CCH may transmit CBR information for the CCH and the SCH prior to the change. Furthermore, the V2X apparatus receives CBR information from adjacent V2X apparatuses. The received CBR information may include information on a CCH and at least one SCH. The V2X apparatus obtains CBR information for a plurality of channels, and transmits the obtained CBR information through an SHB packet. That is, the V2X apparatus after the state of (2) may obtain and transmit CBR information for a CCH and at least one SCH as in the state of (1). As the time that the V2X apparatus stays in the CCH is longer, the V2X apparatus may obtain CBR information for more channels, and may transmit CBR information for more channels.

2. Select Channel Based on Obtained CBR Information (S10020)

A V2X apparatus may transmit or receive a safety message, such as CANM or DAMN in a CCH, and may change its channel to an SCH for non-security service transmission and reception. If a plurality of V2X apparatuses accesses the same SCH, a channel bottleneck phenomenon in which congestion occurs only in the corresponding SCH and other channels are idle may occur. An adhoc network does not have a backbone network or managing the channels of equipment belonging to a network. Accordingly, it is preferred that V2X apparatuses are distributed to channels that are not congested as much as possible.

A V2X apparatus may check the state of a multi-channel using CBR information received through an SCH packet in a CCH. Furthermore, the V2X apparatus may select a proper channel when a request for a channel change to an SCH occurs in a higher layer, and may switch to the selected channel.

In an embodiment, a V2X apparatus may select an SCH having a minimum CBR value as an SCH that the V2X apparatus will switch by comparing the CBR values of respective channels. In an embodiment, if a CBR value has expired with respect to a specific channel or a corresponding CBR value is not present, the CBR value may be set to 0. That is, if a CBR value for a specific channel is not obtained or an obtained value has expired, a V2X apparatus may reset a CBR value for the channel to 0.

3. Channel Switching and CBR Information Measurement for Switched Channel (S10030) and Transmit CBR Information (S10040) on Switched Channel A V2X apparatus may move to a selected SCH and receive or transmit a message/service. The V2X apparatus that has changed its channel may operate as follows.

(1) If a V2X Apparatus that has Changed its Channel Transmits a Message/Service

After switching to an SCH, a V2X apparatus may transmit an SHB packet, including CBR information, in the corresponding SCH. In an embodiment, a V2X apparatus may transmit CBR information for a plurality of channels, obtained in a CCH, along with CBR information for a current SCH. For example, if a V2X apparatus has switched to an SCH_6 channel, the V2X apparatus may transmit an SHB packet, including CBR information for a plurality of channels (CCH and at least one SCH) obtained in a CCH, along with CBR information for the SCH_6.

A V2X apparatus that continues to use a specific SCH can obtain CBR information for a plurality of channel because the V2X apparatus that has switched to the SCH transmits CBR information for other channels. Accordingly, a channel change to a channel having less congestion, such as data offloading, is made possible. For example, if CBR information received from an apparatus that has entered SCH_5 indicates that SCH_3 is more idle than the SCH_5, a V2X apparatus that provides services in the SCH_5 may switch to the SCH_3 and provide services. Accordingly, the V2X apparatus can obtain multi-channel CBR information although it does not tune all of a plurality of channels or access a CCH.

(2) If a V2X Apparatus that has Changed its Channel Receives a Message/Service

A V2X apparatus that has changed its channel may perform CBR measurement for the changed channel. However, if the V2X apparatus has moved to an SCH in order to receive a message/service, it does not transmit multi-channel CBR information obtained in a CCH. Accordingly, the V2X apparatus that has changed its channel may first transmit multi-channel CBR information although it has moved its channel in order to receive a message/service. If the V2X apparatus has moved from a CCH to an SCH, it may transmit an SHB packet, including CBR information for a multi-channel obtained in the CCH, and may then receive or transmit a message/service.

The V2X apparatus may generate CBR information for the changed SCH, and may transmit an SHB packet including the CBR information. In an embodiment, an SHB packet may include CBR information for a current SCH and CBR information for a CCH. In another embodiment, an SHB packet may also include CBR information for a current SCH and CBR information for a CCH and at least one different SCH obtained in the CCH. When an SCH packet is transmitted, it may include time information in which an SCH CBR has been measured. The time information may be included in the SHB packet as a time stamp for each of pieces of CBR information.

FIG. 11 illustrates CBR information for an MCO according to an embodiment of the disclosure.

In an embodiment of the disclosure, the extended header of an SHB packet header may include CBR information for an MCO. In FIG. 11, a DCC-MCO field corresponds to CBR information for an MCO. The CBR information for an MCO includes CBR information (local CBR and global CBR) for a reference channel, and may further include CBR information for an additional channel.

As in FIG. 11, DCC-MCO information includes CBR information for a specific channel. That is, the DCC-MCO information includes local CBR information (CBR_L0_Hop) and global CBR information (CBR_L1_Hop) for a CCH or a specific SCH. The CRB information for a CCH or a specific SCH may further include channel number information.

The DCC-MCO information may further include CBR information for an additional channel. The DCC-MCO information may include channel number information and CBR information for channels through which a CBR has been obtained. The channel number information for an additional channel may correspond to an actual channel number that is officially used, or may correspond to a channel number allocated for signaling. That is, the channel number may indicate a channel number, such as 172 or 174 as in FIG. 3, or may indicate a given channel number, such as 01 or 02 assigned to each channel.

In FIG. 11, N_a, that is, the number of additional channels, indicates the number of channels having effective CBR information. For example, if a total number of available channels is 5 and CBR information measured in three channels including a current channel is valid, N_a becomes 3, and the number of additional channels including the CBR information becomes 2, that is, N_a−1.

Although not illustrated in FIG. 11, information on power may be inserted along with a header as described above. Furthermore, time information for determining valid timing of the CBR information may be included.

Figure 12:
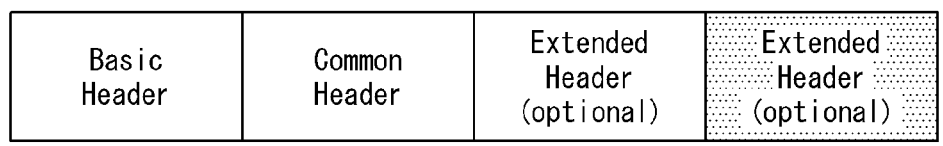
FIG. 12 illustrates a GeoNetworking packet header according to an embodiment of the disclosure.

FIGS. 12 to 14 illustrate a method of transmitting CBR information for an MCO according to other embodiments of the disclosure.

FIG. 12 illustrates a GeoNetworking packet header according to an embodiment of the disclosure.

In an embodiment, the GeoNetworking packet header may include a basic header, a common header, an extended header and an enhanced header. Whether the enhanced header is present may be signaled by the extended header. In an embodiment, whether the enhanced header is present may be signaled using 1 bit included in the reserved field of the extended header.

FIG. 13 illustrates an extended header included in a GeoNetworking packet header according to an embodiment of the disclosure.

DCC-MCO information of the extended header includes CBR information for a specific channel. That is, the CBR information of the extended header includes local CBR information (CBR_L0_Hop) and global CBR information (CBR_L1_Hop) for a CCH or a specific SCH. The CRB information for a CCH or a specific SCH may further include channel number information. The channel number information may correspond to an actual channel number that is officially used or may correspond to a channel number allocated for signaling. That is, the channel number may indicate a channel number, such as 172 or 174, as in FIG. 3, or may indicate a given channel number, such as 01 or 02 allocated to each channel. As in FIG. 13, information on transmission power may be included in the extended header.

The extended header may further include information indicating whether an enhanced header is present. For example, when one bit of a reserved field is 0, it may indicate that an enhanced header is not present. When one bit of the reserved field is 1, it may indicate that an enhanced header is present. The CBR information for an MCO in FIG. 11 may be included in the enhanced header.

FIG. 14 illustrates an enhanced header included in a GeoNetworking packet header according to an embodiment of the disclosure.

DCC-MCO information of an enhanced header includes CBR information for an additional channel.

The DCC-MCO information of an enhanced header may include channel number information and CBR information for channels through which a CBR has been obtained. The channel number information for an additional channel may correspond to an actual channel number that is officially used or may correspond to a channel number allocated for signaling. That is, the channel number may indicate a channel number, such as 172 or 174, as in FIG. 3, or may indicate a given channel number, such as 01 or 02 allocated to each channel.

In FIG. 14, N_a, that is, the number of additional numbers, indicates the number of channels having effective CBR information. For example, if a total number of available channels is 5 and CBR information measured in three channels including a current channel is valid, N_a becomes 3, and the number of additional channel including the CBR information becomes 2, that is, N_a−1.

Although not illustrated in FIG. 14, information on power may be inserted along with a header as described above. Furthermore, time information for determining valid timing of the CBR information may be included.

Figure 15:
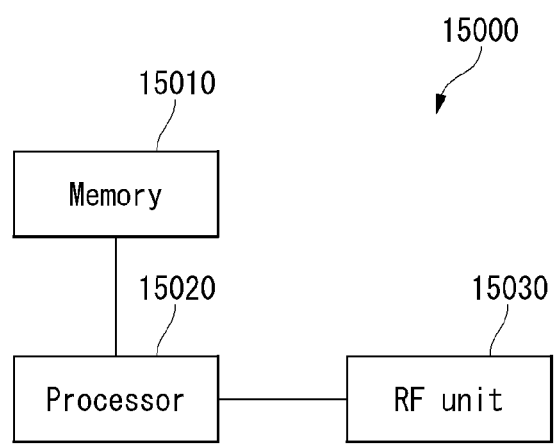
FIG. 15 illustrates a V2X communication apparatus according to an embodiment of the disclosure.

FIG. 15 illustrates a V2X communication apparatus according to an embodiment of the disclosure.

FIG. 15 illustrates a block diagram of the V2X communication apparatus according to an embodiment of the disclosure.

In FIG. 15, the V2X communication apparatus 15000 may include a memory 15010, a processor 15020 and an RF unit 15030. As described above, the V2X communication apparatus may correspond to an on board unit (OBU) or a road side unit (RSU) or may be included in an OBU or RSU. The V2X communication apparatus may be included in an ITS station or may correspond to an ITS station.

The RF unit 15030 is connected to the processor 15020 and may transmit/receive a radio signal. The RF unit 15030 may up-convert data, received from the processor 15020, into a transmission or reception band, and may transmit a signal. The RF unit may implement an operation of the access layer. In an embodiment, the RF unit may implement an operation of the physical layer included in the access layer or may additionally implement an operation of the MAC layer. The RF unit may include a plurality of sub-RF units in order perform communication according to a plurality of communication protocols.

The processor 15020 is connected to the RF unit 15030 and may implement operations of layers according to an ITS system or a WAVE system. The processor 15020 may be configured to perform operations according to the aforementioned various embodiments of the disclosure according to the drawings and description. Furthermore, at least one of a module, data, a program or software that implements an operation of the V2X communication apparatus 15000 according to the aforementioned various embodiments of the disclosure may be stored in the memory 15010 and executed by the processor 15020.

The memory 15010 is connecter to the processor 15020 and stores various pieces of information for driving the processor 15020. The memory 15010 is installed inside the processor 15020 or outside the processor 15020, and may be connected to the processor 15020 by known means. The memory may include a security/non-security storage device or may be included in a security/non-security storage device.

In some embodiments, the memory may be referred to as a security/non-security storage device.

A detailed configuration of the V2X communication apparatus 15000 in FIG. 15 may be implemented so that various embodiments of the disclosure are independently applied or two or more of the embodiments are applied together. In FIG. 15, a data communication method of the V2X communication apparatus 15000 according to an embodiment of the disclosure is the same as that described in relation to FIGS. 10 to 14. In FIG. 15, the V2X communication apparatus 15000 or the processor 15020 may perform the methods of the disclosure by performing the aforementioned operation of each layer according to the protocol stack.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

MODE FOR INVENTION

Those skilled in the art will understand that the disclosure may be changed and modified in various ways without departing from the spirit or range of the disclosure. Accordingly, the disclosure is intended to include all the changes and modifications provided by the appended claims and equivalents thereof.

In this disclosure, both the apparatus and the method have been described, and the descriptions of both the apparatus and method may be complementarily applied.

Various embodiments have been described in Best Mode for Invention.

INDUSTRIAL APPLICABILITY

The disclosure is used in a series of vehicle communication fields.

Those skilled in the art will understand that the disclosure may be changed and modified in various ways without departing from the spirit or range of the disclosure. Accordingly, the disclosure is intended to include all the changes and modifications provided by the appended claims and equivalents thereof.

The invention claimed is:

1. A multi-channel operation method of a vehicle-to-everything (V2X) communication apparatus, comprising:
obtaining channel busy ratio (CBR) information for a reference channel and at least one service channel;
based on the CBR information, selecting a first service channel to which switching is to be performed;
performing channel switching to the first service channel and measuring CBR information for the first service channel;
transmitting, on the first service channel, a first transport packet including first multi-channel CBR information; and
performing decentralized congestion control (DCC) processing to control data traffic based on the CBR information,
wherein the first multi-channel CBR information includes local 0-hop CBR information and local 1-hop CBR information for each of the reference channel and the at least one service channel including the first service channel,
wherein the local 0-hop CBR information indicates a local CBR for a specific frequency channel with respect to an intelligent transport system (ITS) station itself, and
wherein the local 1-hop CBR information indicates the highest value based on local 0-hop CBR information received from an adjacent ITS station.

2. The multi-channel operation method of claim 1,
wherein the first multi-channel CBR information further includes channel information to identify a channel described by the local 0-hop CBR information and the local 1-hop CBR information and power information for the first transport packet.

3. The multi-channel operation method of claim 1,
wherein obtaining the CBR information for the reference channel and the at least one service channel further includes:
receiving, from an external V2X communication apparatus, a second transport packet including remote 0-hop CBR information and remote 1-hop CBR information for the reference channel and the at least one service channel; and
measuring local CBR information for the reference channel or the at least one service channel.

4. The multi-channel operation method of claim 3,
wherein selecting the first service channel to which switching is to be performed includes:
obtaining a maximum CBR value for each service channel from the remote 0-hop CBR information, the remote 1-hop CBR information and the local 0-hop CBR information, and selecting, as the first service channel, a service channel whose maximum CBR value is a minimum.

5. The multi-channel operation method of claim 1, further including:

transmitting, in the reference channel, a second transport packet including second multi-channel CBR information based on the first service channel switching to the reference channel, wherein the second multi-channel CBR information includes local 0-hop CBR information and local 1-hop CBR information for each of the reference channel and the at least one service channel including the first service channel.

6. A vehicle-to-everything (V2X) communication apparatus, comprising:

a memory; a transceiver; and a processor for controlling the transceiver and the memory, wherein the processor is configured to:

obtain channel busy ratio (CBR) information for a reference channel and at least one service channel, based on the CBR information, select a first service channel to which switching is to be performed, switch to the first service channel, measure CBR information for the first service channel, transmit, on the first service channel, a first transport packet comprising first multi-channel CBR information, and perform decentralized congestion control (DCC) processing to control data traffic based on the CBR information, wherein the first multi-channel CBR information comprises local 0-hop CBR information and local 1-hop CBR information for each of the reference channel and the at least one service channel including the first service channel, wherein the local 0-hop CBR information indicates a local CBR for a specific frequency channel with respect to an intelligent transport system (ITS) station itself, and wherein the local 1-hop CBR information indicates the highest value based on local 0-hop CBR information received from an adjacent ITS station.

7. The V2X communication apparatus of claim 6, wherein the first multi-channel CBR information further comprises channel information to identify a channel described by the local 0-hop CBR information and the local 1-hop CBR information and power information for the first transport packet.

8. The V2X communication apparatus of claim 6, wherein obtaining the CBR information for the reference channel and the at least one service channel is performed by:

receiving, from an external V2X communication apparatus, a second transport packet comprising remote 0-hop CBR information and remote 1-hop CBR information for the reference channel and the at least one service channel, and measuring local CBR information for the reference channel or the at least one service channel.

9. The V2X communication apparatus of claim 8, wherein selecting the first service channel to which switching is to be performed is performed by:

obtaining a maximum CBR value for each service channel from the remote 0-hop CBR information, the remote 1-hop CBR information and the local 0-hop CBR information, and determining a service channel whose maximum CBR value is a minimum.

10. The V2X communication apparatus of claim 6, wherein based on the first service channel switching to the reference channel, a second transport packet comprising second multi-channel CBR information is transmitted in the reference channel, and wherein the second multi-channel CBR information comprises local 0-hop CBR information and local 1-hop CBR information for each of the reference channel and the at least one service channel comprising the first service channel.

\* \* \* \* \*